(12) United States Patent
Kontkanen et al.

(10) Patent No.: US 12,265,574 B2
(45) Date of Patent: *Apr. 1, 2025

(54) USING INTERPOLATION TO GENERATE A VIDEO FROM STATIC IMAGES

(71) Applicant: Google LLC, Mountain View, CA (US)

(72) Inventors: Janne Kontkanen, San Francisco, CA (US); Jamie Aspinall, Mountain View, CA (US); Dominik Kaeser, New York City, NY (US); Navin Sarma, Palo Alto, CA (US); Brian Curless, Seattle, WA (US); David Salesin, Sausalito, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,262

(22) Filed: Dec. 20, 2023

(65) Prior Publication Data

US 2024/0126810 A1    Apr. 18, 2024

Related U.S. Application Data

(63) Continuation of application No. 17/566,462, filed on Dec. 30, 2021, now Pat. No. 11,893,056.
(Continued)

(51) Int. Cl.
*G06F 16/75* (2019.01)
*G06F 16/738* (2019.01)
(Continued)

(52) U.S. Cl.
CPC ............ *G06F 16/739* (2019.01); *G06F 16/75* (2019.01); *G06F 16/7867* (2019.01);
(Continued)

(58) Field of Classification Search
CPC .... G06F 16/739; G06F 16/75; G06F 16/7867; G06N 20/00; G06T 7/20; H04N 5/2628
See application file for complete search history.

(56) References Cited

U.S. PATENT DOCUMENTS 10,489,897 B2 * 11/2019 Staranowicz ............ G06T 5/20
10,958,869 B1 * 3/2021 Chi ........................ H04N 11/02
(Continued)

FOREIGN PATENT DOCUMENTS

JP   2003-141559   5/2003
JP   2021-010099   1/2021
(Continued)

OTHER PUBLICATIONS

EPO, Partial International Search for International Patent Application No. PCT/US2021/065764, Apr. 4, 2022, 8 pages.
(Continued)

*Primary Examiner* — Thai Q Tran
*Assistant Examiner* — Jose M Mesa
(74) *Attorney, Agent, or Firm* — IP Spring

(57) ABSTRACT

A media application selects, from a collection of images associated with a user account, candidate pairs of images, where each pair includes a first static image and a second static image from the user account. The media application applies a filter to select a particular pair of images from the candidate pairs of images. The media application generates, using an image interpolator, one or more intermediate images based on the particular pair of images. The media application generates a video that includes three or more frames arranged in a sequence, where a first frame of the sequence is the first static image, a last frame of the sequence is the second static image, and each of the one or more intermediate images is a corresponding intermediate frame of the sequence between the first frame and the last frame.

20 Claims, 8 Drawing Sheets

Related U.S. Application Data

(60) Provisional application No. 63/190,234, filed on May 18, 2021.

(51) Int. Cl.
    *G06F 16/78*     (2019.01)
    *G06N 20/00*     (2019.01)
    *G06T 7/20*     (2017.01)
    *H04N 5/262*     (2006.01)

(52) U.S. Cl.
    CPC ............... *G06N 20/00* (2019.01); *G06T 7/20* (2013.01); *H04N 5/2628* (2013.01)

(56) References Cited

U.S. PATENT DOCUMENTS

| | | | |
|---|---|---|---|
| 11,288,543 B1* | 3/2022 | Tovchigrechko | G06V 10/44 |
| 2003/0025810 A1 | 2/2003 | Pilu et al. | |
| 2010/0058397 A1* | 3/2010 | Rogers | H04N 21/242 |
| | | | 705/26.1 |
| 2012/0311623 A1* | 12/2012 | Davis | H04N 5/765 |
| | | | 725/18 |
| 2018/0315174 A1 | 11/2018 | Staranowicz et al. | |
| 2019/0197667 A1* | 6/2019 | Paluri | H04N 5/33 |
| 2020/0356827 A1 | 11/2020 | Dinerstein et al. | |

FOREIGN PATENT DOCUMENTS

| | | |
|---|---|---|
| KR | 20200057844 | 5/2020 |
| KR | 10-2020-0130105 | 11/2020 |
| KR | 10-2021-0018182 | 2/2021 |
| WO | 2021/025717 | 2/2021 |

OTHER PUBLICATIONS

EPO, Written Opinion for International Patent Application No. PCT/US2021/065764, Jul. 13, 2022, 13 pages.

EPO, International Search Report for International Patent Application No. PCT/US2021/065764, Jul. 13, 2022, 6 pages.

Hua, et al., "Content based photograph slide show with incidental music", ISCAS '03, vol. 2, May 25, 2003, pp. IL648-Il651.

Hua, et al., "Photo2Video—A System for Automatically Converting Photographic Series Into Video", IEEE Transactions on Circuits and Systems for Video Technology, IEEE Service Center, Piscataway, NJ, vol. 16, No. 7, Jul. 1, 2006, pp. 803-819.

Liao, et al., "Depth Map Design and Depth-based Effects With a Single Image", Graphics Interface. Vol. 2; retrieved from Internet: https://www.researchgate.net/profile/Jingtang-Liao/publication/317044981_Depth_Map_Design_and_Depth-based_Effects_With_a_Single_Image, 2017, 7 pages.

USPTO, Non-final Office Action for U.S. Appl. No. 17/566,462, Jun. 5, 2023, 18 pages.

USPTO, Notice of Allowance for U.S. Appl. No. 17/566,462, Sep. 25, 2023, 6 pages.

Van Amersfoort, et al., "Frame interpolation with multi-scale deep loss functions and generative adversarial networks", arXiv preprint arXiv:1711.06045, 2017, 17 pages.

JPO, Office Action (with English translation) for Japanese Patent Application No. 2023-528278, May 21, 2024, 10 pages.

KIPO, Office Action (with English translation) for Korean Patent Application No. 10-2023-7010192, Oct. 7, 2024, 13 pages.

JPO, Notice of Allowance (with English translation) for Japanese Patent Application No. 2023-528278, Oct. 29, 2024, 5 pages.

\* cited by examiner

USING INTERPOLATION TO GENERATE A VIDEO FROM STATIC IMAGES

CROSS-REFERENCE TO RELATED APPLICATIONS

The present application is a continuation of U.S. patent application Ser. No. 17/566,462, filed Dec. 30, 2021 and titled USING INTERPOLATION TO GENERATE A VIDEO FROM STATIC IMAGES, which claims priority to U.S. Provisional Patent Application No. 63/190,234, filed May 18, 2021 and titled USING INTERPOLATION TO GENERATE A VIDEO FROM STATIC IMAGES, the contents of both of which are incorporated herein in their entirety.

BACKGROUND

Users of devices such as smartphones or other digital cameras capture and store a large number of photos and videos in their image libraries. Users utilize such libraries to view their photos and videos to reminisce about various events such as birthdays, weddings, vacations, trips, etc. Users may have large image libraries with thousands of images taken over a long time period.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method includes selecting, from a collection of images associated with a user account, candidate pairs of images, where each pair includes a first static image and a second static image from the user account. The method further includes applying a filter to select a particular pair of images from the candidate pairs of images. The method further includes generating, using an image interpolator, one or more intermediate images based on the particular pair of images. The method further includes generating a video that includes three or more frames arranged in a sequence, where a first frame of the sequence is the first static image, a last frame of the sequence is the second static image, and each of the one or more intermediate images is a corresponding intermediate frame of the sequence between the first frame and the last frame.

In some embodiments, the filter includes a time filter that excludes the one or more of the candidate pairs of images when a time difference between respective timestamps associated with the first static image of the pair and the second static image of the pair is greater than a time threshold. In some embodiments, each of the one or more intermediate images is associated with a respective timestamp that has a value between a timestamp of the first static image and a timestamp of the second static image, and wherein a position of each intermediate image in the sequence is based on the respective timestamp. In some embodiments, the time threshold is 2 seconds. In some embodiments, the filter includes a motion filter that excludes the one or more of the candidate pairs of images by: estimating motion between the first static image and the second static image and determining that the motion between the first static image and the second static image is less than a minimum motion threshold. In some embodiments, the filter further excludes the one or more of the candidate pairs of images by determining that the motion between the first static image and the second static image exceeds a maximum motion threshold. In some embodiments, the filter includes a filter machine-learning module that excludes the one or more of the candidate pairs of images by: generating feature vectors that represent the first static image and the second static image in each of the candidate pairs and excluding the one or more of the candidate pairs that correspond to respective feature vectors where a distance between the respective feature vectors is greater than a threshold vector distance, wherein the feature vectors are mathematical representations and wherein mathematical representations of similar images are closer in vector space than the mathematical representations of dissimilar images. In some embodiments, the feature vectors are first feature vectors and the filter machine-learning module is further operable to: receive an intermediate image of the one or more intermediate images as input, generate one or more second feature vectors that correspond to the intermediate image, and exclude the one or more intermediate images that correspond to respective features vectors where a distance between the respective feature vector of the intermediate image to the respective feature vectors of corresponding candidate pairs of images is greater than the threshold vector distance. In some embodiments, the image interpolator includes an interpolation machine-learning model that receives the first static image and the second static image as input and that generates the one or more intermediate images. In some embodiments, generating the one or more intermediate images based on the particular pair of images includes: generating a plurality of candidate intermediate images and evaluating each candidate intermediate image by: generating a candidate video that includes the first static image as a first frame, the candidate intermediate image as a second frame, and the second static image as a third frame and selecting the candidate intermediate image as one of the one or more intermediate images if the candidate video does not include a frame interpolation failure. In some embodiments, the method further comprises determining the frame interpolation failure using a discriminator machine-learning model that is trained to determine whether an input image is a generated image, wherein the candidate intermediate image is selected if the discriminator machine-learning model determines that the candidate intermediate image is indistinguishable from the generated image. In some embodiments, the method further comprises determining that a frame interpolation failure occurs if the filter excludes the one or more intermediate images and responsive to the frame interpolation failure occurring, generating additional one or more intermediate images. In some embodiments, generating the video includes, generating, using a depth machine-learning model, a three-dimensional representation of a scene in the first static image based on a prediction of depth of the first static image, wherein the depth machine-learning model is a classifier that receives the first static image as input, wherein the video includes a camera effect that is generated based on the three-dimensional representation of the scene. In some embodiments, the camera effect includes at least one of zooming, panning, or rotation.

The specification advantageously describes a way to synthesize movement between a pair of images and fill in the gaps with new generated frames to create a video from the pair of images. The specification describes a media application that filters out candidate pairs of images, performs frame interpolation of a particular pair of images to generate intermediate images, and generates a video from the particular pair of images and the intermediate images. The specification advantageously describes a way to balance the demands of a series of filters with high recall and faster computational time with a series of filters with high precision and a slower computational time.

DETAILED DESCRIPTION

Example Environment 100

Figure 1:
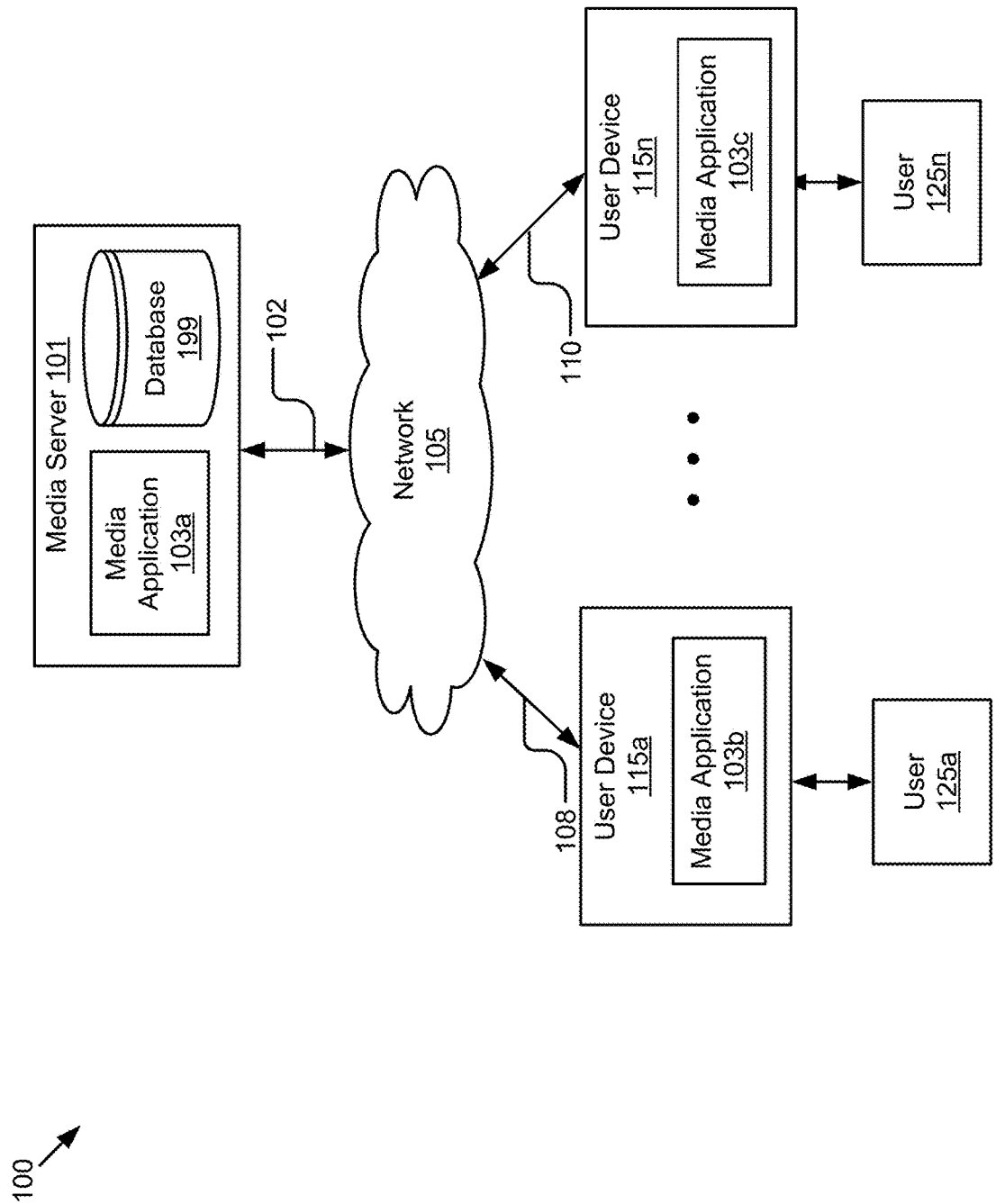
FIG. 1 is a block diagram of an example network environment, according to some embodiments described herein.

FIG. 1 illustrates a block diagram of an example environment 100. In some embodiments, the environment 100 includes a media server 101, a user device 115a, and a user device 115n, all coupled to a network 105. Users 125a, 125n may be associated with respective user devices 115a, 115n. In some embodiments, the environment 100 may include other servers or devices not shown in FIG. 1 or the media server 101 may not be included. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The media application 103a may include code and routines (including one or more trained machine-learning models) operable to cause a user interface to generate a video with motion from at least two static images. In some embodiments, the media application 103a may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103a may be implemented using a combination of hardware and software.

The database 199 may store a collection of media (e.g., static images; images with movement such as animated GIFs or motion images; videos; etc.) associated with a user account. The database 199 may store media items that are indexed and associated with identities of the users 125 of the user devices 115. The database 199 may also store social network data associated with users 125, user preferences for the users 125, etc.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, a user account includes a collection of images. For example, a user captures images and video from their camera (e.g., smartphone or other camera), uploads images from a digital single lens reflex (DSLR) camera, adds images captured by another user that is shared with them to their collection of images, etc.

Although the example below is written with pairs of static images, the media application 103 may generate the video using at least two static images. A media application 103 selects candidate pairs of images from the collection of images. Each pair of images may include a first static image and a second static image from the library.

The media application 103 applies a filter that selects a particular pair of images from the candidate pairs of images. For example, the filter may exclude candidate pairs that are not near duplicates, candidate pairs without artifacts, candidate pairs of poor quality, a large number of candidate pairs, candidate pairs that are not close in chronological order, candidate pairs that are outside of an accepted range of times (e.g., within two seconds of the images being captured, more than 0.1 seconds of each other, etc.), candidate pairs that are dissimilar (have less than a threshold similarity), candidate pairs with too much motion (have greater than a threshold level of motion), candidate pairs that lack bi-directional optical flow, and/or candidate pairs that are visually distinguishable (e.g., one of the images has a visual enhancement or filter applied to it that renders it different from the other image). For example, the media application 103 excludes pairs where an estimate of motion between the first static image and the second static image exceeds a first motion threshold (e.g., there is too much motion between the two static images that needs to be depicted via interpolated images) and/or an estimate of motion between the first static image and the second static is less than a minimum motion threshold (e.g., there is too little motion between the two static images). In some embodiments, the media application 103 selects a particular pair of images where the motion between the pairs is greater than a first threshold and less than a second threshold, where the images depict certain types of subjects (e.g., faces, pets, humans, etc.), where images meet a quality threshold (e.g., are not blurry, are well-lit, etc.), where images depict an interesting emotion (e.g., a smiling fact), and/or where images depict particular types of activity (e.g., sports, dance, etc.).

The media application 103 may generate, using an image interpolator, one or more intermediate images based on the two static images. Each of the one or more intermediate images may be associated with a respective timestamp that has a value between the timestamp of the first static image and the timestamp of the second static image. A position of each image in the sequence may be based on the respective timestamp.

In some embodiments, generating the one or more intermediate images based on the two static images includes: generating a plurality of candidate intermediate images and evaluating each candidate intermediate image by: generating a candidate video that includes the first static image as a first frame, the candidate intermediate image as a second frame, and the second static image as a third frame and selecting the candidate intermediate image as one of the one or more intermediate images if the candidate video does not include a frame interpolation failure.

In some embodiments, the image interpolator is an interpolation machine-learning model (e.g., a generative model) that receives the first static image and the second static image as input and that generates the one or more intermediate images to simulate the motion between the first image and the second image. The interpolation machine-learning model may be trained on a training set of videos that include motion. For example, the interpolation machine-learning model may receive a subset of frames of the video as input, and generate, as output, one or more of the missing frames. A cost function based on a difference between the generated frames and their corresponding original frames (excluded from the subset) may be used to train the model. Examples of such a loss function include, but are not limited to, a pixel-wise L2 or L1 loss between the one or more generated frames and their corresponding original frames. The training may comprise applying an optimization routine, such as stochastic gradient descent or the like, to the loss function to determine updates to the parameters of the interpolation machine-learning model. The optimization routine may be applied until a threshold condition is satisfied. The threshold condition may comprise a threshold number of training iterations and/or a threshold performance on a test dataset being reached. For example, the model may be considered sufficiently trained when the cost function is minimized, e.g., when the generated frame and corresponding original frame, are indistinguishable. A classifier may be trained to perform the comparison of the generated frame and the corresponding original frame. The training set of videos, obtained with user permission, may include various types of videos, e.g., videos that depict facial motion such as smiling or eyes opening/closing; body motion such as walking, dancing, jumping, etc.; motion of pets; etc.

The media application 103 may use a depth machine-learning model to generate a three-dimensional representation of a scene in the first image based on a prediction of the depth of the first image. For example, the depth machine-learning model may be a classifier that receives the first image as input and that outputs the prediction of depth in the first image. The prediction of depth may comprise depth coordinates of objects/features in the image, e.g. z-axis coordinates of objects in the image, where the image is in the x-y plane. The video may include a camera effect that is generated based on the three-dimensional representation of the scene. The camera effect may include zooming and/or panning.

In some embodiments, the depth machine-learning model includes a neural network. In some embodiments, the neural network includes a convolutional neural network. For example, the convolutional neural network may extract features from an input image and create a three-dimensional image by providing a low-resolution version and improving the three-dimensional image iteratively. In some embodiments, the depth machine-learning (ML) model may be trained using a training set of images and their corresponding depth maps. For example, the depth ML model may be trained to predict depth for an image in the training set and the prediction may be compared with ground truth in the depth map, with the difference being used as feedback during the training to update parameters of the depth machine-learning model. The comparison of the predicted depths and the ground truth depth map may be performed using a loss function, such as an L1 or L2 loss between predicted depths and their corresponding ground truth depths. An optimization routine may be applied to the loss function to determine parameter updates.

The media application 103 may cause a user interface to be displayed that includes the video. The media application 103 may also provide a notification to the user that the video is available. The media application 103 may generate the videos for any images that are not excluded by the filter. The media application 103 may generate the videos periodically, e.g., once a month, once a week, daily, etc.

Computing Device Example 200

Figure 2:
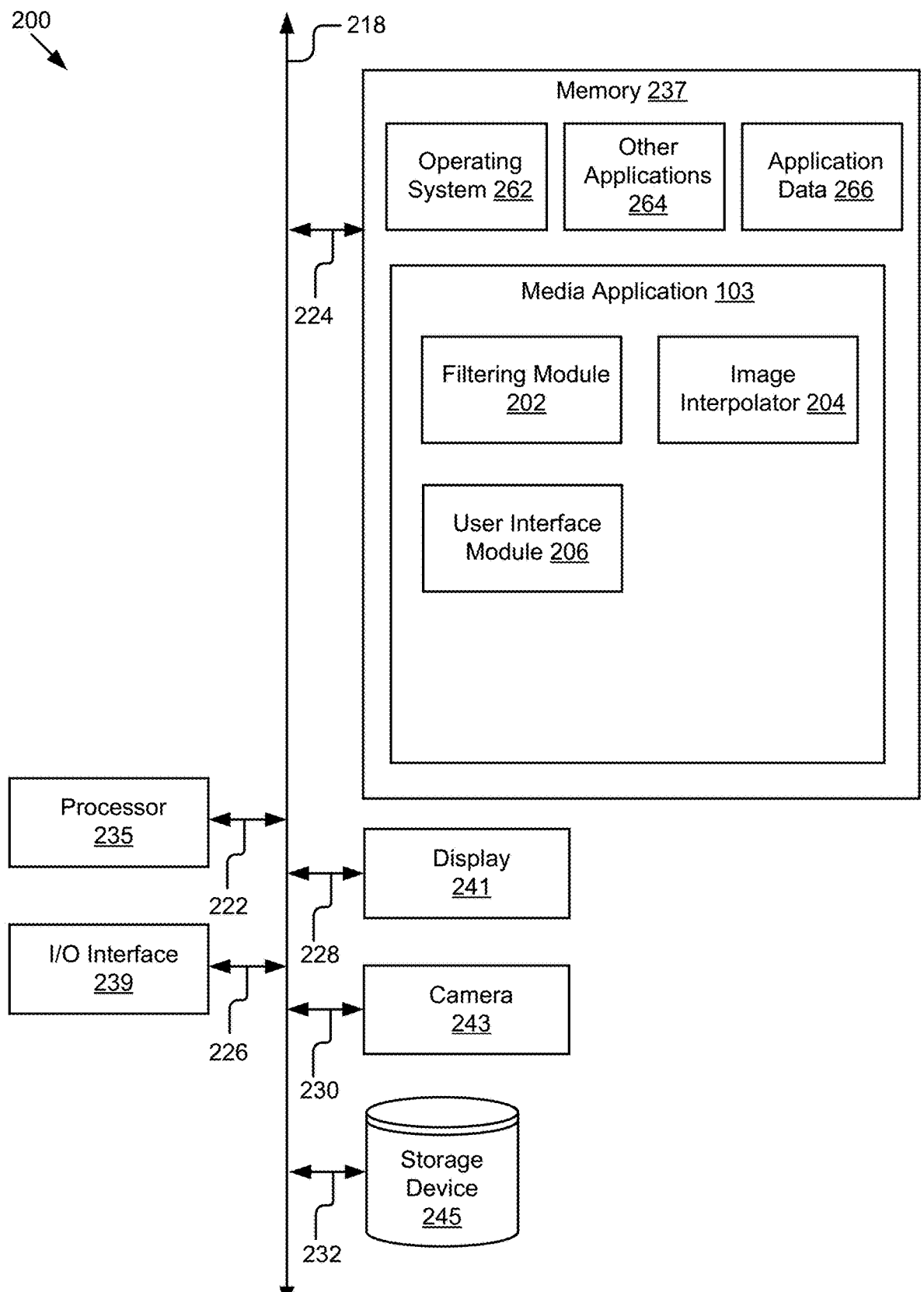
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is a user device 115 used to implement the media application 103. In another example, computing device 200 is the media server 101. In yet another example, the media application 103 is in part on the user device 115 and in part on the media server 101.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In the primary example, all computations are performed within a mobile application on a mobile computing device. However, it is also possible to use a client/server architecture, e.g., a mobile computing device sends user input data to a server device and receives from the server the final output data for output (e.g., for display). In another example, computations can be split between the mobile computing device and one or more server devices.

In some embodiments, computing device 200 includes a processor 235, a memory 237, an I/O interface 239, a display 241, a camera 243, and a storage device 245. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., a camera application, an image library application, an image management application, an image gallery application, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images captured by the camera 243, user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or database 199), and input/output devices can communicate via I/O interface 239. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). For example, when a user provides touch input, I/O interface 239 transmits the data to the media application 103.

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a subset of pairs of candidate images. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store the collection of images associated with a user account, training sets for machine-learning models, videos, etc. In embodiments where the media application 103 is part of the media server 101, the storage device 245 is the same as the database 199 in FIG. 1.

Example Media Application 103

FIG. 2 illustrates an example media application 103 that includes a filtering module 202, an image interpolator 204, and a user interface module 206.

The filtering module 202 applies a filter to select a particular pair of images from candidate pairs of images. In some embodiments, the filtering module 202 includes a set of instructions executable by the processor 235 to apply the filter. In some embodiments, the filtering module 202 is stored in the memory 237 of the computing device 200 and can be accessible and executable by the processor 235.

In some embodiments, the filtering module 202 includes a time filter that excludes candidate pairs of images where there is too much time separating the images, where the time refers to a capture time of the images. For example, the time filter excludes candidate pairs of images when a time difference between respective timestamps associated with a first static image and a second static image is greater than a time threshold. The time threshold may be any time value, such as two seconds, one minute, one day, etc.

In some embodiments, the time filter excludes candidate pairs of images that are not in chronological order. In some embodiments, the time filter changes the order of any candidate pairs that are not in chronological order and resubmits them to the filtering module 202 for analysis. For example, even if a candidate pair of images is in chronological order, the filter module 202 may exclude the candidate pair of images, such as if the time between a first static image and a second static image exceed the time threshold.

In some embodiments, the filtering module 202 includes a motion filter that excludes candidate pairs of images that have too much motion or too little motion. For example, the motion filter may estimate motion between the first static image and the second static image and exclude a candidate pair of images if the motion between the first static image and the second static image is less than a minimum motion threshold. In another example, the motion filter may also exclude candidate pairs of images when the motion between the first static image and the second static image exceed a maximum motion threshold.

In some embodiments, the filtering module 202 includes a quality filter that excludes candidate pairs of images with a quality that is less than a quality threshold. For example, the quality filter excludes candidate pairs of images where one or both of the candidate pairs of images are blurry, noisy, violating the rule of thirds (where an image is divided into thirds and the subject should be in one third of the image), etc.

In some embodiments, the filtering module 202 includes a semantic filter that excludes candidate pairs of images that do not have subjects that are determined to be of interest to a user. For example, user interest may be determined based on (a) express preferences provided by the user (e.g., a specific person or pats that the user is interested in); (b) user behavior (with permission, determining the individuals that are most frequently featured in the user's captured images, images the user views often, images that the user has provided indications of approval for (e.g., likes, thumbs up, +1, etc.)—and where such determination includes a technical comparison of a current image with a known user interest attribute (e.g., depicts person A). The filtering module 202 may only make this determination subject to permission from the user to collect user data.

The filtering module 202 may include a list of acceptable subjects that are personalized for the user or more general. For example, a user may consistently indicate approve of certain subjects, such as the user's daughter, dog, landscapes, etc. In another example, the semantic module may automatically exclude images of subjects, such as receipts, screenshots of memes, etc.

In some embodiments, the filtering module 202 also excludes images with incompatible image sizes. For example, the filtering module 202 may exclude images that fail to meet a predetermined image size (e.g., less than a particular resolution, e.g., at least 400 pixels wide, at least 500 pixels tall, etc.).

Figure 3:
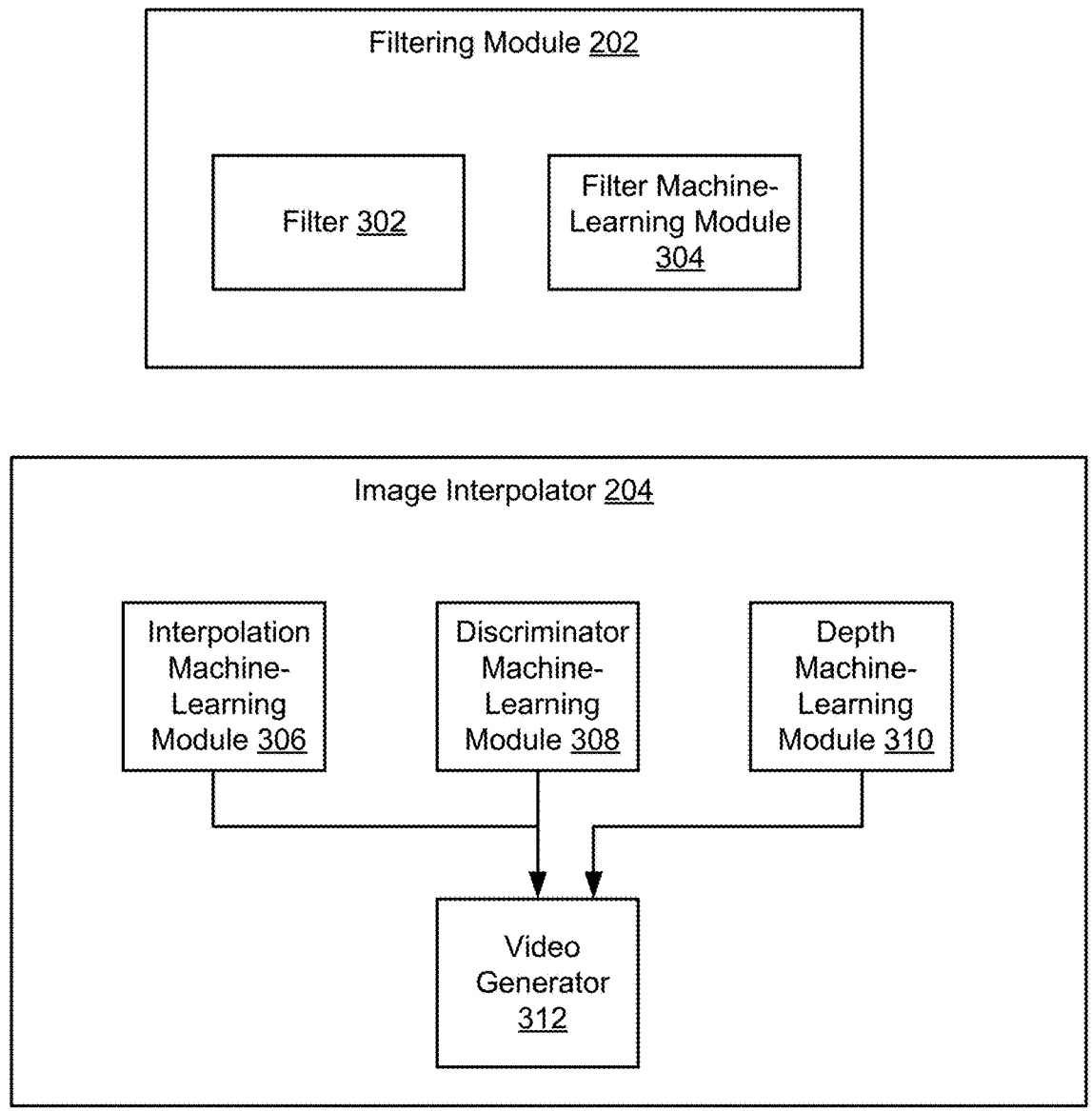
FIG. 3 is a block diagram illustrating the filtering module and the image interpolator in detail, according to some embodiments described herein.

Turning to FIG. 3, a detailed example 300 of the filtering module 202 and the image interpolator 204 is illustrated. In some embodiments the filtering module 202 includes one or both of a filter 302 and a filter machine-learning module 304. In some embodiments, the filter 302 includes one or more of the time filter, the motion filter, the quality filter, the semantic filter, etc.

In some embodiments, the filter machine-learning module 304 includes a machine-learning model that is trained to generate feature vectors from candidate images and filter the candidate images based on the feature vectors. In some embodiments, the filter machine-learning module 304 includes a set of instructions executable by the processor 235 to generate the feature vectors. In some embodiments, the filter machine-learning module 304 is stored in the memory 237 of the computing device 200 and can be accessible and executable by the processor 235.

In some embodiments, the filter machine-learning module 304 may generate feature vectors that represent the first static image and the second static image in each of the candidate pairs in a multidimensional feature space. Images with similar features may have similar feature vectors, e.g., the feature vectors are mathematical representations and the mathematical representations of similar images are closer in vector space than the mathematical representations dissimilar images. The vector space may be a function of various factors of the image, e.g., the depicted subject matter (objects detected in the image), composition of the image, color information, image orientation, image metadata, specific objects recognized in the image (e.g., with user permission, a known face), etc.

In some embodiments, the filter machine-learning module 304 may use training data (obtained with permission for the purposes of training) to generate a trained model, specifically, the filter machine-learning model. For example, training data may include ground truth data in the form of pairs of images that are associated with descriptions of the visual similarity of the pairs of images. In some embodiments, the descriptions of the visual similarity may include feedback from users about whether the pairs of images are related. In some embodiments, the descriptions of the visual similarity may be automatically added by image analysis. Training data may be obtained from any source, e.g., a data repository specifically marked for training, data for which permission is provided for use as training data for machine-learning, etc. In some embodiments, the training may occur on the media server 101 that provides the training data directly to the user device 115, the training occurs locally on the user device 115, or a combination of both.

In some embodiments, training data may include synthetic data generated for the purpose of training, such as data that is not based on activity in the context that is being trained, e.g., data generated from simulated or computer-generated images/videos, etc. In some embodiments, the filter machine-learning module 304 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The filter machine-learning module 304 may read the data file for the trained model and implement neural networks with node connectivity, layers, and weights based on the model structure or form specified in the trained model.

The filter machine-learning module 304 generates a trained model that is herein referred to as a filter machine-learning model. In some embodiments, the filter machine-learning module 304 is configured to apply the filter machine-learning model to data, such as application data 266 (e.g., a pair of candidate images), to identify one or more features in each candidate image and to generate respective feature vectors (embedding) representative of the pair of candidate images. In some embodiments, the filter machine-learning module 304 may include software code to be executed by processor 235. In some embodiments, the filter machine-learning module 304 may specify circuit configuration (e.g., for a programmable processor, for a field programmable gate array (FPGA), etc.) enabling processor 235 to apply the filter machine-learning model. In some embodiments, the filter machine-learning module 304 may include software instructions, hardware instructions, or a combination. In some embodiments, the filter machine-learning module 304 may offer an application programming interface (API) that can be used by the operating system 262 and/or other applications 264 to invoke the filter machine-learning module 304, e.g., to apply the filter machine-learning model to application data 266 to output the respective feature vectors for the pair of candidate images. In some embodiments, the candidate pairs of images that are kept by the filter machine-learning module 304 are closer in vector space than the mathematical representations of pairs of candidate images that are excluded by the filter machine-learning module 304.

In some embodiments, the filter machine-learning model includes a classifier that takes as input the pairs of candidate images. Examples of classifiers include neural-networks, support vector machines, k-nearest neighbor, logistic regression, naïve bayes, decision trees, perceptron, etc.

In some embodiments, the filter machine-learning model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 266. Such data can include, for example, one or more pixels per node, e.g., when the filter machine-learning model is used for analysis, e.g., input images, such as a pair of candidate images. Subsequent intermediate layers may receive as input, output of nodes of a previous layer per the connectivity specified in the model form or structure. These layers may also be referred to as hidden layers. A final layer (e.g., output layer) produces an output of the filter machine-learning model. For example, the output may be feature vectors for the candidate pairs of images. In some embodiments, the model form or structure also specifies a number and/or type of nodes in each layer.

The features output by the filter machine-learning module 304 may include a subject (e.g., sunset vs. a particular person); colors present in an image (a green hill vs. a blue lake); color balance; lighting source, angles, and intensity; a position of objects in the image (e.g., adherence to the rule of thirds); position of objects relative to each other (e.g., depth of field), location of the shot; focus (foreground vs. background); or shadows. While the foregoing features are human-understandable, it will be understood that the features output may be embeddings or other mathematical values that are representative of the image and are not human parseable (e.g., no individual feature value may correspond to a particular feature such as colors present, object position, etc.); however, the trained model is robust to images such that similar features are output for similar images, and images with significant dissimilarities have correspondingly dissimilar features. Examples of such models include the encoder of an auto-encoder model.

In some embodiments, the model form is a CNN with network layers where each network layer extracts image features at different levels of abstraction. A CNN that is used to identify features in an image may be used for image classification. The model architecture may include combinations and orderings of layers made up of multi-dimensional convolutions, average pooling, max pooling, activation functions, normalization, regularization, and other layers and modules used in practice for applied deep neural networks.

In different embodiments, the filter machine-learning model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. For example, the filter machine-learning module 304 may adjust a respective weight based on feedback responsive to automatically updating the one or more parameters of the filter machine-learning model.

In some embodiments, the computation performed by a node may also include applying a step/activation function to the adjusted weighted sum. In some embodiments, the step/activation function may be a nonlinear function, such as the ReLU function, sigmoid function, tanh function etc. In various embodiments, such computation may include operations such as matrix multiplication. In some embodiments, computations by the plurality of nodes may be performed in parallel, e.g., using multiple processor cores of a multicore processor, using individual processing units of a graphical processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the filter machine-learning model may include embeddings or weights for individual nodes. For example, the filter machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The filter machine-learning model may then be trained, e.g., using the training set of pairs of images, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., pairs of images from a collection of images associated with a user account) and a corresponding expected output for each pair of images (e.g., image embeddings for pairs of images). Based on a comparison of the output of the filter machine-learning model with the expected output, values of the weights are automatically adjusted, e.g., in a manner that increases a probability that the filter machine-learning model produces the expected output when provided similar input. The comparison may be performed using a loss function, with the adjusted weight values determined by applying an optimization routine to the loss function.

In some embodiments, training may include applying unsupervised learning techniques. In unsupervised learning, only input data (e.g., pairs of images from a collection of images associated with a user account) may be provided and the filter machine-learning model may be trained to differentiate data, e.g., to cluster pairs of images into different groups.

In various embodiments, a trained model includes a set of weights, corresponding to the model structure. In embodiments where a training set is omitted, the filter machine-learning module 304 may generate a filter machine-learning model that is based on prior training, e.g., by a developer of the filter machine-learning module 304, by a third-party, etc. In some embodiments, the filter machine-learning model may include a set of weights that are fixed, e.g., downloaded from a server that provides the weights.

In some embodiments, the filter machine-learning module 304 may be implemented in an offline manner. Implementing the filter machine-learning module 304 may include using a static training set that does not include updates as the data in the static training set changes. This advantageously results in increased efficiency in processing performed by the computing device 200 and a reduced power consumption of the computing device 200. In these embodiments, the filter machine-learning model may be generated in a first stage and provided as part of the filter machine-learning module 304. In some embodiments, small updates of the filter machine-learning model may be implemented in an online manner where updates to the training data are included as part of the training of the filter machine-learning model. A small update is an update that has a size smaller than a size threshold. The size of an update relates to the number of variables in the filter machine-learning model that are affected by the update. In such embodiments, an application that invokes the filter machine-learning module 304 (e.g., operating system 262, one or more of other applications 264, etc.) may utilize the image embeddings for pairs of candidate images in order to identify visually similar clusters. The filter machine-learning module 304 may also generate system logs periodically, e.g., hourly, monthly, quarterly, etc. and may be used to update the filter machine-learning model, e.g., to update embeddings for the filter machine-learning model.

In some embodiments, the filter machine-learning module 304 may be implemented in a manner that can adapt to a particular configuration of computing device 200 on which the filter machine-learning module 304 is executed. For example, the filter machine-learning module 304 may determine a computational graph that utilizes available computational resources, e.g., processor 235. For example, if the filter machine-learning module 304 is implemented as a distributed application on multiple devices, such as instances where the media server 101 includes multiple media servers 101, the filter machine-learning module 304 may determine computations to be carried out on individual devices in a manner that optimizes computation. In another example, the filter machine-learning module 304 may determine that processor 235 includes a GPU with a particular number of GPU cores (e.g., 1000) and implement the filter machine-learning module 304 accordingly (e.g., as 1000 individual processes or threads).

In some embodiments, the filter machine-learning module 304 may implement an ensemble of trained models. For example, the filter machine-learning model may include a plurality of trained models that are each applicable to the same input data. In these embodiments, the filter machine-learning module 304 may choose a particular trained model, e.g., based on available computational resources, success rate with prior inferences, etc.

In some embodiments, the filter machine-learning module 304 may execute a plurality of trained models. In these embodiments, the filter machine-learning module 205 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the filter machine-learning module 304 may apply a time threshold for applying individual trained models (e.g., 0.5 ms) and utilize only those individual outputs that are available within the time threshold. Outputs that are not received within the time threshold may not be utilized, e.g., excluded. For example, such approaches may be suitable when there is a time limit specified while invoking the filter machine-learning module 304, e.g., by operating system 262 or one or more applications 264. In that manner, the maximum time taken by the filter machine-learning module 304 to perform a task, e.g. to identify one or more features in a pair of candidate images and to generate respective feature vectors (embedding) representative of the pair of candidate images, can be bounded, which improves the responsiveness of the media application 103 and results in the filter machine-learning module 304 providing real-time guarantees for a best-effort classification.

In some embodiments, operation of the filter machine-learning module 304 causes the one or more candidate pairs that correspond to the respective feature vectors where a distance between the respective feature vectors is greater than a threshold vector distance to be excluded.

In some embodiments, the filter machine-learning module 304 receives feedback. For example, the filter machine-learning module 304 may receive feedback via the user interface module 206 from one user or a set of users. The feedback may include, for example, that a pair of candidate images are too dissimilar to be used to generate a video. If a single user provides feedback, the filter machine-learning module 304 provides the feedback to the filter machine-learning model, which uses the feedback to update parameters of the filter machine-learning model to modify the output image embeddings for clusters of pairs of candidate images. In cases where a set of users provide feedback, the filter machine-learning module 304 provides the aggregated feedback to the filter machine-learning model that uses the aggregated feedback to update parameters of the filter machine-learning model to modify the output image embeddings for clusters of pairs of candidate images. For example, the aggregated feedback may include a subset of the videos and how users reacted to the subset of the videos by viewing only one video and declining to view the rest of the videos, viewing all of the videos in the subset, sharing videos, providing an indication of approval or disapproval (e.g., thumbs up/thumbs down, like, +1, etc.) of videos, etc. The filter machine-learning module 304 may modify the clusters of pairs of candidate images based on updating the parameters of the filter machine-learning model.

Figure 4:
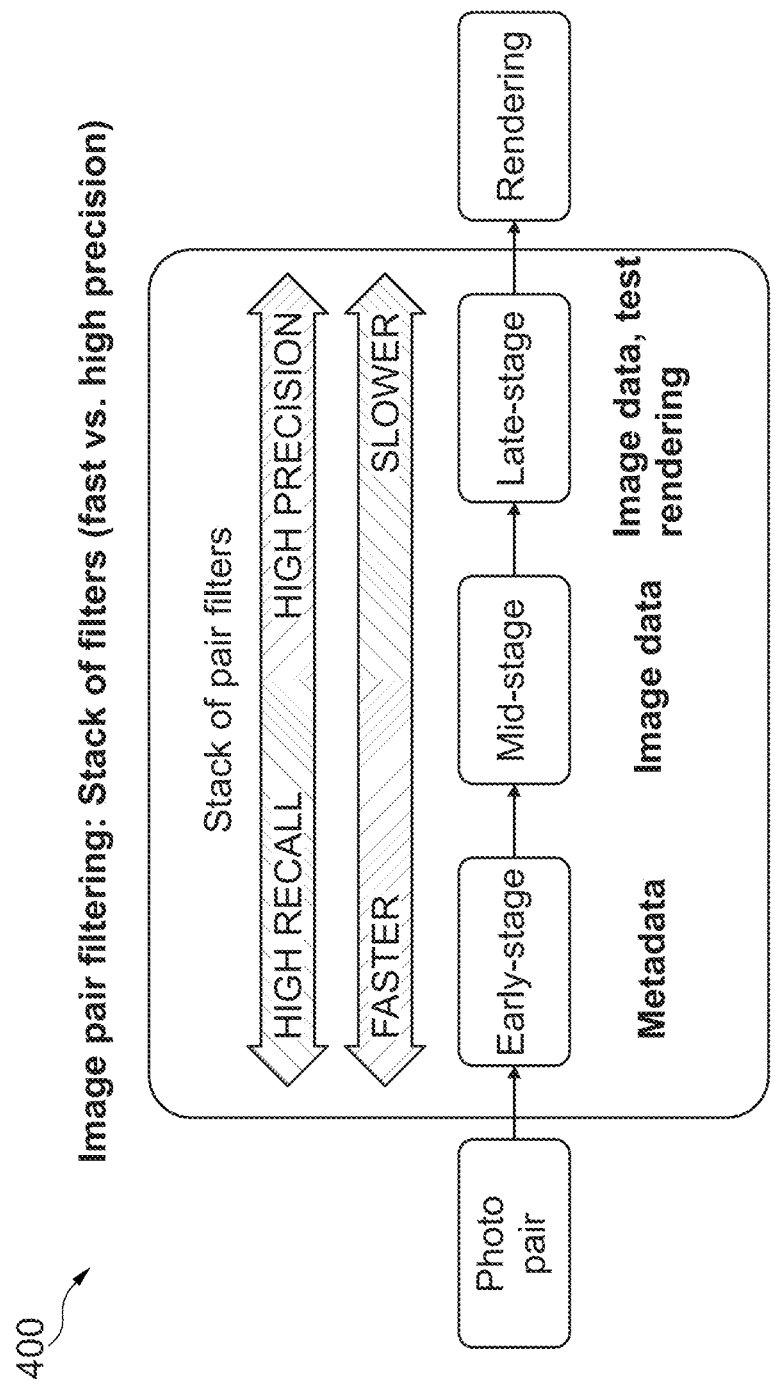
FIG. 4 illustrates examples of different filters to be applied to the pair of images, according to some embodiments described herein.

In some embodiments, the filtering module 202 determines a subset of the different filters to apply to candidate pairs of images. Turning to FIG. 4, different options 400 for filters to be applied to the pair of images are illustrated. The filters can be classified as early-stage filters, mid-stage filters, and late-stage filters. Early-stage filters may perform analysis of image metadata, such as a time filter that excludes candidate pairs of images that are too far away in time. Mid-stage filters may perform analysis of the image data, such as a motion filter that excludes candidate pairs of images that have too much motion. Late-stage filters may include image data and test rendering. The balance between the different filters may be filters that are faster to implement but have higher recall with filters that are slower but that have higher precision. In some embodiments, the filtering module 202 may determine the subset of the different filters based on how quickly the video needs to be generated. For example, if videos are generated once a month, the processing time may not be as important. However, if the video was requested by a user, the processing time may need to be minimized in order to provide a response to the user within a short amount of time such that the application that provides the video is deemed responsive.

In some embodiments, the filtering module 202 selects a particular pair of images from the candidate pairs of images. For example, the particular pair of images is a pair that was not excluded by the filtering module 202. In some embodiments, the particular pair of images is selected based on being the first pair of images in the candidate pairs of images that was not excluded by the filtering module 202.

In some embodiments, the filter machine-learning module 304 receives an intermediate image of the one or more intermediate images as input to the filter machine-learning module from the image interpolator 204, generates a feature vector that corresponds to the intermediate image, and excludes the intermediate image if it is too dissimilar to the corresponding first static image or the second static image. For example, the image interpolator 204 generates a feature vector from an intermediate image and compares the feature vector to the feature vectors for the corresponding candidate pair of images and excludes the intermediate image if a distance between the feature vector of the intermediate image and either of the feature vectors of the candidate pair of images is greater than a threshold vector distance.

The image interpolator 204 generates one or more intermediate images based on the particular pair of images. In some embodiments, the image interpolator 204 includes a set of instructions executable by the processor 235 to generate the one or more intermediate images. In some embodiments, the image interpolator 204 is stored in the memory 237 of the computing device 200 and can be accessible and executable by the processor 235.

In some embodiments, the image interpolator 204 generates one or more intermediate images that include the intermediate steps such that insertion of the one or more intermediate images as frames between a first static frame and a second static frame provide a smooth animation when the frames are displayed in succession as a video. For example, FIG. 5 includes an example of interpolation between the first frame 500 and the second frame 575 with two intermediate frames 550a, 550b. This example illustrates that the first frame 500 has open eyes and a closed mouth, and the second frame 575 has partially closed eyes and a partially open mouth with a smiling expression. The image interpolator 204 generates intermediate frames 550a, 550b to include motion of closing the eyes and moving the mouth. When displayed sequentially (in order of 500, 550a, 550b, 575) as a video, the intermediate frames 550a, 550b enable a viewer to perceive smooth motion between the first static image 500 and the second static image 575.

Figure 5:
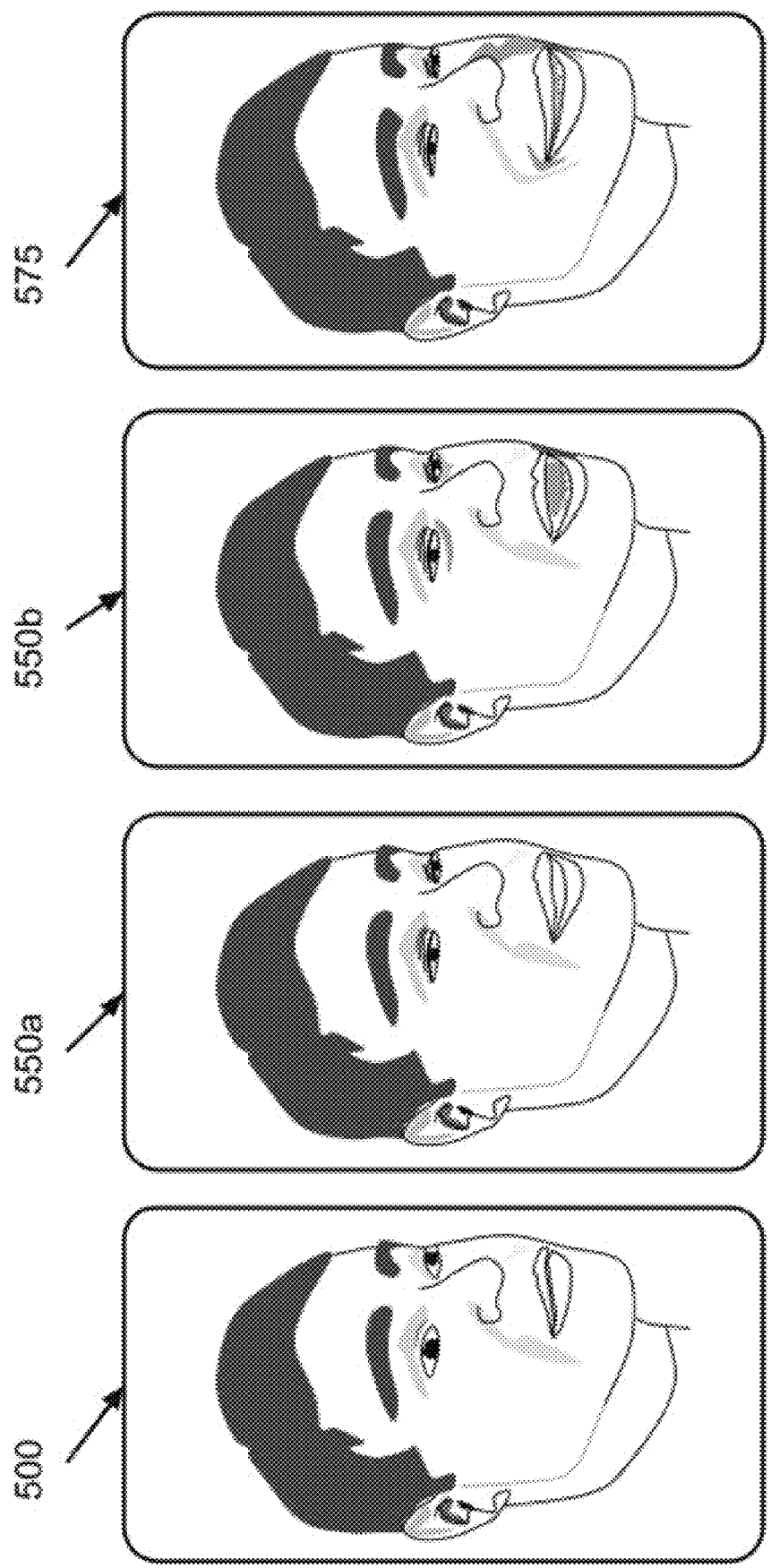
FIG. 5 includes an example of computer-generated interpolation between the first image and the second image with two intermediate images, according to some embodiments described herein.

While FIG. 5 illustrates two intermediate images, in different implementations, the image interpolator 204 generates one, two, three, or more intermediate images. In some embodiments, the number of intermediate images may be a function of total motion between frames 500 to 575 where the more motion occurs, the greater number of intermediate images are generated. In some embodiments, the image interpolator 204 generates a number of intermediate images based on available compute capacity where more intermediate images are generated if there is a high capacity and fewer intermediate images are generated if there is a low capacity. In some embodiments, the image interpolator 204 may generate the number of intermediate images based on image resolution where the image interpolator 204 generates more intermediate images if the selected pair of images have a high resolution. In some embodiments, the image interpolator 204 generates more intermediate images based on the refresh rate of the user device 115. For example, a higher refresh rate (e.g., 120 Hz) may require more intermediate images than a lower refresh rate (e.g., 50 Hz).

In some embodiments, the image interpolator 204 receives multiple pairs of consecutive images and generates multiple intermediate images. For example, the image interpolator 204 may receive particular pairs of images a, b, c, and d, such that a, b; b, c; and c, d constitute pairs of images. The image interpolator 204 may generate one or more intermediate pairs for each particular pair of images.

In some embodiments, each intermediate image is associated with a respective timestamp that has a value between the timestamp of the first static image and the timestamp of the second static image. In some embodiments, the image interpolator 204 organizes the video based on the respective timestamps of the first static image, the one or more intermediate images, and the second static image.

In some embodiments, the image interpolator 204 generates the one or more intermediate images by generating candidate intermediate images, evaluating each candidate intermediate image by generating a candidate video that includes the first static image as a first frame, the candidate intermediate image as a second frame, and the second static image as a third frame, and selecting the candidate intermediate image as one of the one or more intermediate images if the candidate video does not include a frame interpolation failure. The frame interpolation failure may occur in response to providing the intermediate images to the filtering module 202 or based on failure detected by the image interpolator 204 as discussed in greater detail below with reference to the discriminator machine-learning module 308.

In some embodiments, the image interpolator 204 transmits each intermediate image to the filtering module 202, for example, the filter machine-learning module 304 to ensure that the intermediate image is similar enough to the particular pair of images. If the filtering module 202 does not exclude the intermediate image, the image interpolator 204 generates the video. If the filter machine-learning module 304 excludes the intermediate image, the exclusion is considered a frame interpolation failure and the image interpolator 204 generates additional one or more intermediate images.

Turning to FIG. 3, a detailed example 300 of the filtering module 202 and the image interpolator 204 is illustrated. In some embodiments the image interpolator 204 includes an interpolation machine-learning module 306, a discriminator machine-learning module 308, a depth machine-learning module 310, and a video generator 312.

In some embodiments, one or more of the interpolation machine-learning module 306, the discriminator machine-learning module 308, and the depth machine-learning module 310 are each layers/blocks in a neural network or they may each be a separate neural network. For example, the interpolation machine-learning module 306 may receive the particular pair of images as input and output one or more intermediate images that are input to the discriminator machine-learning module 208. The discriminator machine-learning module 208 may then output the one or more intermediate images if they do not include a frame interpolation failure. The one or more intermediate images may then be input for the video generator 312. The depth machine-learning module 310 may also receive a first static input as input and output a three-dimensional representation of a scene to the video generator 312. Other embodiments are possible. For example, the interpolation machine-learning module 306 and the discriminator machine-learning module 308 may be layers in a neural network or the interpolation machine-learning module 306 and the depth machine-learning module 310 may be layers in a neural network. In yet another example, the interpolation machine-learning module 306 may work alone and directly provide the one or more intermediate images as output to the video generator 312.

In some embodiments, the interpolation machine-learning module 306 includes an interpolation machine-learning model that is trained to receive the first static image and the second static image as input and generate one or more intermediate images as output. The interpolation machine-learning module 306 may include any type of generative machine learning model that is trained to generate an image from a pair of input images. In some embodiments, the interpolation machine-learning module 306 includes a set of instructions executable by the processor 235 to generate the one or more intermediate images. In some embodiments, the interpolation machine-learning module 306 is stored in the memory 237 of the computing device 200 and can be accessible and executable by the processor 235.

In some embodiments, the interpolation machine-learning module 306 may use training data (obtained with permission for the purposes of training) to generate a trained model, specifically, the interpolation machine-learning model. For example, training data may include ground truth data in the form of pairs of images and intermediate images that are associated with descriptions of the visual similarity of the pairs of images to the intermediate images. In some embodiments, the descriptions of the visual similarity may be automatically added by image analysis. Training data may be obtained from any source, e.g., a data repository specifically marked for training, data for which permission is provided for use as training data for machine-learning, etc. In some embodiments, the training may occur on the media server 101 that provides the training data directly to the user device 115, the training occurs locally on the user device 115, or a combination of both.

In some embodiments, training data may include synthetic data generated for the purpose of training, such as data that is not based on activity in the context that is being trained, e.g., data generated from simulated or computer-generated images/videos, etc. In some embodiments, the interpolation machine-learning module 306 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The interpolation machine-learning module 306 may read the data file for the trained model and implement neural networks with node connectivity, layers, and weights based on the model structure or form specified in the trained model.

In some embodiments, the interpolation machine-learning module 306 is configured to apply the interpolation machine-learning model to data, such as application data 266 (e.g., a pair of selected images) and to generate one or more intermediate images that may approximate the position of objects that are different between the first static image and the second static image. For example, where there is a first static image and a second static image, the interpolation machine-learning module 306 outputs a first intermediate image and then a series of intermediate images. In this example, the first static image and the second static image depict a toddler and an infant. Both children's heads are rotated differently between the first static image and the second static image. In this example, the interpolation machine-learning module 306 generates one intermediate image with the children's heads at positions that are between the first static image and the second static image. In some embodiments, the interpolation machine-learning module 306 generates additional intermediate images with the children's heads at positions that are between the first static image and the second static image.

In some embodiments, the interpolation machine-learning module 306 may include software code to be executed by processor 235. In some embodiments, the interpolation machine-learning module 306 may specify circuit configuration (e.g., for a programmable processor, for a field programmable gate array (FPGA), etc.) enabling processor 235 to apply the interpolation machine-learning model. In some embodiments, the interpolation machine-learning module 306 may include software instructions, hardware instructions, or a combination. In some embodiments, the interpolation machine-learning module 306 may offer an application programming interface (API) that can be used by the operating system 262 and/or other applications 264 to invoke the interpolation machine-learning module 306, e.g., to apply the interpolation machine-learning model to application data 266 to output the one or more intermediate images.

In some embodiments, the interpolation machine-learning model includes a classifier that takes as input the pairs of selected images. Examples of classifiers include neural-networks, support vector machines, k-nearest neighbor, logistic regression, naïve bayes, decision trees, perceptron, etc.

In some embodiments, the interpolation machine-learning model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 266. Such data can include, for example, one or more pixels per node, e.g., when the interpolation machine-learning model is used for analysis, e.g., input images, such as a pair of selected images. Subsequent intermediate layers may receive as input, output of nodes of a previous layer per the connectivity specified in the model form or structure. For example, a first intermediate image that is in the middle of the first static image and the second static image may be part of a first intermediate layer. These layers may also be referred to as hidden layers. A final layer (e.g., output layer) produces an output of the interpolation machine-learning model. For example, the output may be a series of intermediate images based on the first static image, the second static image, and the first intermediate image. In some embodiments, the model form or structure also specifies a number and/or type of nodes in each layer.

In some embodiments, the model form is a CNN with network layers where each network layer extracts image features at different levels of abstraction. A CNN that is used to identify features in an image may be used for image classification. The model architecture may include combinations and orderings of layers made up of multi-dimensional convolutions, average pooling, max pooling, activation functions, normalization, regularization, and other layers and modules used in practice for applied deep neural networks.

In different embodiments, the interpolation machine-learning model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. For example, the interpolation machine-learning module 306 may adjust a respective weight based on feedback responsive to automatically updating the one or more parameters of the interpolation machine-learning model.

In some embodiments, the computation performed by a node may also include applying a step/activation function to the adjusted weighted sum. In some embodiments, the step/activation function may be a nonlinear function, such as the ReLU function, sigmoid function, tanh function etc. In various embodiments, such computation may include operations such as matrix multiplication. In some embodiments, computations by the plurality of nodes may be performed in parallel, e.g., using multiple processor cores of a multicore processor, using individual processing units of a graphical processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the interpolation machine-learning model may include embeddings or weights for individual nodes. For example, the interpolation machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The interpolation machine-learning model may then be trained, e.g., using the training set of pairs of images, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., pairs of images from a collection of images associated with a user account) and a corresponding expected output for each pair of images (e.g., one or more intermediate images). Based on a comparison of the output of the interpolation machine-learning model with the expected output, values of the weights are automatically adjusted, e.g., in a manner that increases a probability that the interpolation machine-learning model produces the expected output when provided similar input.

In some embodiments, training may include applying unsupervised learning techniques. In unsupervised learning, only input data (e.g., pairs of images from a collection of images associated with a user account) may be provided and the interpolation machine-learning model may be trained to differentiate data, e.g., to cluster pairs of image into different groups.

In various embodiments, a trained model includes a set of weights, corresponding to the model structure. In embodiments where a training set is omitted, the interpolation machine-learning module 306 may generate an interpolation machine-learning model that is based on prior training, e.g., by a developer of the interpolation machine-learning module 306, by a third-party, etc. In some embodiments, the interpolation machine-learning model may include a set of weights that are fixed, e.g., downloaded from a server that provides the weights.

In some embodiments, the interpolation machine-learning module 306 may be implemented in an offline manner. Implementing the interpolation machine-learning module 306 may include using a static training set that does not include updates as the data in the static training set changes. This advantageously results in increased efficiency in processing performed by the computing device 200 and a reduced power consumption of the computing device 200. In these embodiments, the interpolation machine-learning model may be generated in a first stage and provided as part of the interpolation machine-learning module 306. In some embodiments, small updates of the interpolation machine-learning model may be implemented in an online manner where updates to the training data are included as part of the training of the interpolation machine-learning model. A small update is an update that has a size smaller than a size threshold. The size of an update relates to the number of variables in the interpolation machine-learning model that are affected by the update. In such embodiments, an application that invokes the interpolation machine-learning module 306 (e.g., operating system 262, one or more of other applications 264, etc.) may utilize the image embeddings for clusters of pairs of candidate images in order to identify visually similar clusters. The interpolation machine-learning module 306 may also generate system logs periodically, e.g., hourly, monthly, quarterly, etc. and may be used to update the interpolation machine-learning model, e.g., to update embeddings for the interpolation machine-learning model.

In some embodiments, the interpolation machine-learning module 306 may be implemented in a manner that can adapt to a particular configuration of computing device 200 on which the interpolation machine-learning module 306 is executed. For example, the interpolation machine-learning module 306 may determine a computational graph that utilizes available computational resources, e.g., processor 235. For example, if the interpolation machine-learning module 306 is implemented as a distributed application on multiple devices, such as instances where the media server 101 includes multiple media servers 101, the interpolation machine-learning module 306 may determine computations to be carried out on individual devices in a manner that optimizes computation. In another example, the interpolation machine-learning module 306 may determine that processor 235 includes a GPU with a particular number of GPU cores (e.g., 1000) and implement the interpolation machine-learning module 306 accordingly (e.g., as 1000 individual processes or threads).

In some embodiments, the interpolation machine-learning module 306 may implement an ensemble of trained models. For example, the interpolation machine-learning model may include a plurality of trained models that are each applicable to the same input data. In these embodiments, the interpolation machine-learning module 306 may choose a particular trained model, e.g., based on available computational resources, success rate with prior inferences, etc.

In some embodiments, the interpolation machine-learning module 306 may execute a plurality of trained models. In these embodiments, the filter machine-learning module 205 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the interpolation machine-learning module 306 may apply a time threshold for applying individual trained models (e.g., 0.5 ms) and utilize only those individual outputs that are available within the time threshold. Outputs that are not received within the time threshold may not be utilized, e.g., excluded. For example, such approaches may be suitable when there is a time limit specified while invoking the interpolation machine-learning module 306, e.g., by operating system 262 or one or more applications 264. In that manner, the maximum time taken by the interpolation machine-learning module 306 to perform a task, e.g. to identify one or more features in a pair of selected images and to generate one or more intermediate images, can be bounded, which improves the responsiveness of the media application 103 and results in the interpolation machine-learning module 306 providing real-time guarantees for a best-effort generation of the one or more intermediate images.

In some embodiments, the interpolation machine-learning module 306 receives feedback. For example, the interpolation machine-learning module 306 may receive feedback via the user interface module 206 from one user or a set of users. The feedback may include, for example, that an intermediate image is too dissimilar from the particular pair of images to be used to generate a video. If a single user provides feedback, the interpolation machine-learning module 306 provides the feedback to the interpolation machine-learning model, which uses the feedback to update parameters of the interpolation machine-learning model to modify the output one or more intermediate images. In cases where a set of users provide feedback, the interpolation machine-learning module 306 provides the aggregated feedback to the interpolation machine-learning model that uses the aggregated feedback to update parameters of the interpolation machine-learning model to modify the output intermediate images. For example, the aggregated feedback may include a subset of the videos and how users reacted to the subset of the videos by viewing only one video and declining to view the rest of the videos, viewing all of the videos in the subset, sharing videos, providing an indication of approval or disapproval (e.g., thumbs up/thumbs down, like, +1, etc.) of videos, etc.

In some embodiments, the discriminator machine-learning module 308 includes a discriminator machine-learning model that is trained to receive one or more intermediate images and one or more of the first static image and the second static image as input and output a likelihood that the one or more intermediate images are generated images. In some embodiments, the interpolation machine-learning module 306 includes a set of instructions executable by the processor 235 to output the likelihood that the one or more intermediate images are generated images. In some embodiments, the interpolation machine-learning module 306 is stored in the memory 237 of the computing device 200 and can be accessible and executable by the processor 235.

In some embodiments, the discriminator machine-learning module 308 may use training data (obtained with permission for the purposes of training) to generate a trained model, specifically, a discriminator machine-learning model. For example, training data may include ground truth data in the form of pairs of images and intermediate images that are associated with descriptions of whether the intermediate images are generated images or not. In some embodiments, the descriptions of the intermediate images may be automatically added by image analysis. Training data may be obtained from any source, e.g., a data repository specifically marked for training, data for which permission is provided for use as training data for machine-learning, etc. In some embodiments, the training may occur on the media server 101 that provides the training data directly to the user device 115, the training occurs locally on the user device 115, or a combination of both. In some embodiments, the discriminator model may be jointly trained with the interpolation machine-learning model using a generative-adversarial approach.

In some embodiments, the discriminator machine-learning module 308 is configured to apply the discriminator machine-learning model to data, such as application data 266 (e.g., an intermediate image and one or more of the first static image and the second static image) and to generate a likelihood that the intermediate image is visually indistinguishable from one or more of the first static image and the second static image. In some embodiments, if the likelihood does not meet a threshold value, the intermediate image is excluded. In some embodiments, if the likelihood exceeds the threshold value, the intermediate image is accepted and provided as input to the depth machine-learning module 310 or the video generator 312, depending on the embodiment.

Additional descriptions of how the discriminator machine-learning module 308 uses training data, employs the processor 235, functions as different types of machine-learning models, and the like are described above and the description is not repeated here.

In some embodiments, the depth machine-learning module 310 includes a depth machine-learning model that is trained to receive the first static image as input and output a three-dimensional representation of a scene in the first static image based on a prediction of depth of the first static image. In some embodiments, the interpolation machine-learning module 306 includes a set of instructions executable by the processor 235 to output the likelihood that the one or more intermediate images are generated images. In some embodiments, the interpolation machine-learning module 306 is stored in the memory 237 of the computing device 200 and can be accessible and executable by the processor 235.

In some embodiments, the depth machine-learning module 310 may use training data (obtained with permission for the purposes of training) to generate a trained model, specifically, a depth machine-learning model. For example, training data may include ground truth data in the form of images of a scene and three-dimensional representations with the scene. Training data may be obtained from any source, e.g., a data repository specifically marked for training, data for which permission is provided for use as training data for machine-learning, etc.

In some embodiments, the depth machine-learning module 310 is configured to apply the depth machine-learning model to data, such as application data 266 (e.g., the first static image) and to generate the three-dimensional representation of the scene. In some embodiments, the depth machine-learning model is a classifier that receives the first static image as input and generates the three-dimensional representation of the scene. The three-dimensional representation of the scene may include a camera effect, such as zooming, panning, rotation, or a combination.

Figure 6:
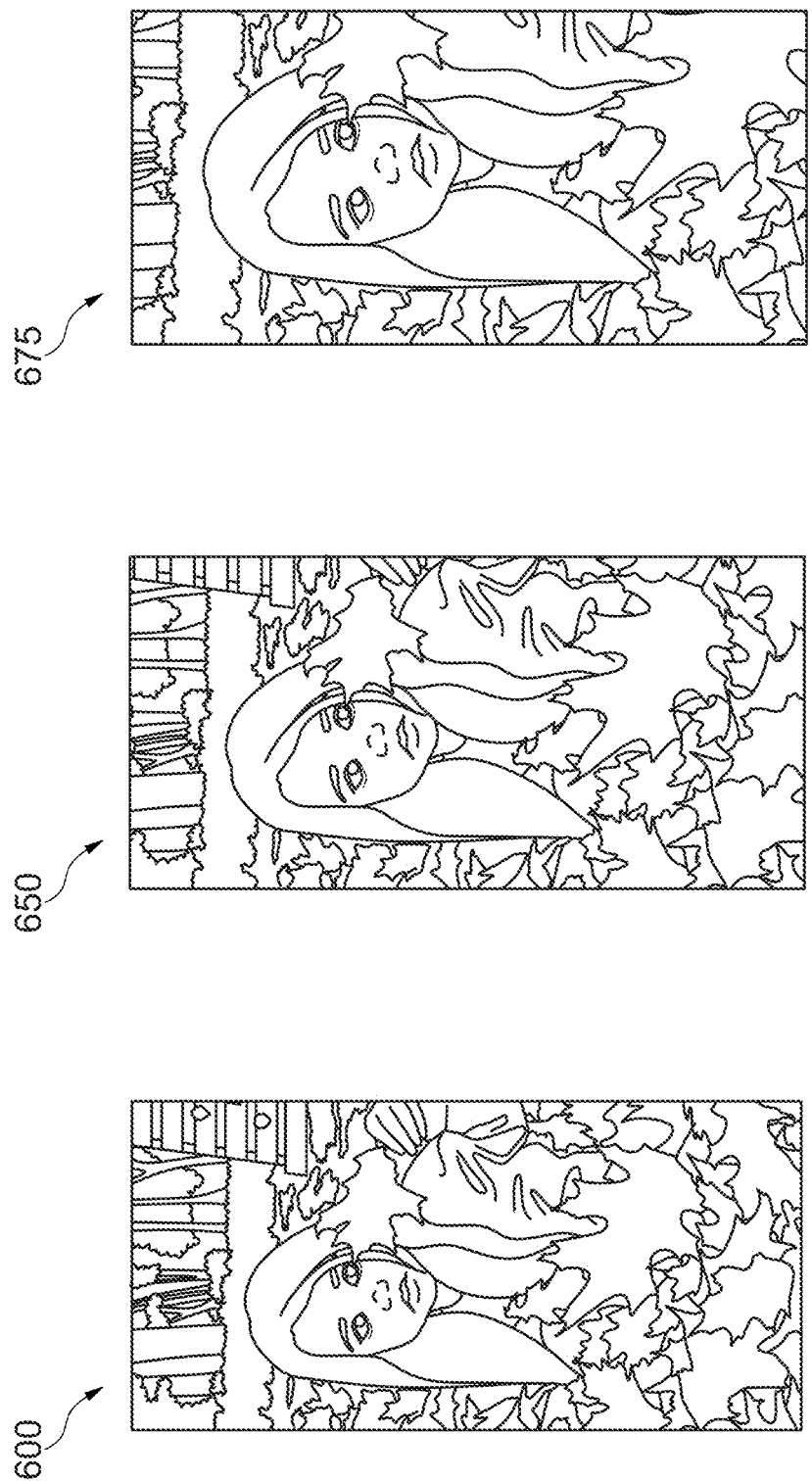
FIG. 6 illustrates an example of a three-dimensional rotation of a static image, according to some embodiments described herein.

FIG. 6 illustrates an example of a three-dimensional zoom of a static image. The first image 600 may be equivalent to the first static image described up above that is received as input to the depth machine-learning model. The depth machine-learning model generates a three-dimensional representation of the scene with a zooming camera effect as output. This is illustrated as the second example 650 and the third example 675. In the example of FIG. 6, the sequence 600-675 provides a viewer with a video in which the person and the leaves are getting closer in the frame, emphasizing depth in the image.

Additional descriptions of how the depth machine-learning module 310 uses training data, employs the processor 235, functions as different types of machine-learning models, and the like are described above and the description is not repeated here.

The video generator 312 generates a video from the first static image, the second static image and one or more intermediate images. In some embodiments, three or more frames are arranged in a sequence where the first frame of the sequence is the first static image, a last frame of the sequence is the second static image and each of the one or more intermediate images is a corresponding intermediate frame of the sequence between the first frame and the last frame.

The user interface module 206 generates a user interface. In some embodiments, the user interface module 206 includes a set of instructions executable by the processor 235 to generate the user interface. In some embodiments, the user interface module 206 is stored in the memory 237 of the computing device 200 and can be accessible and executable by the processor 235.

Example Flowchart

Figure 7A:
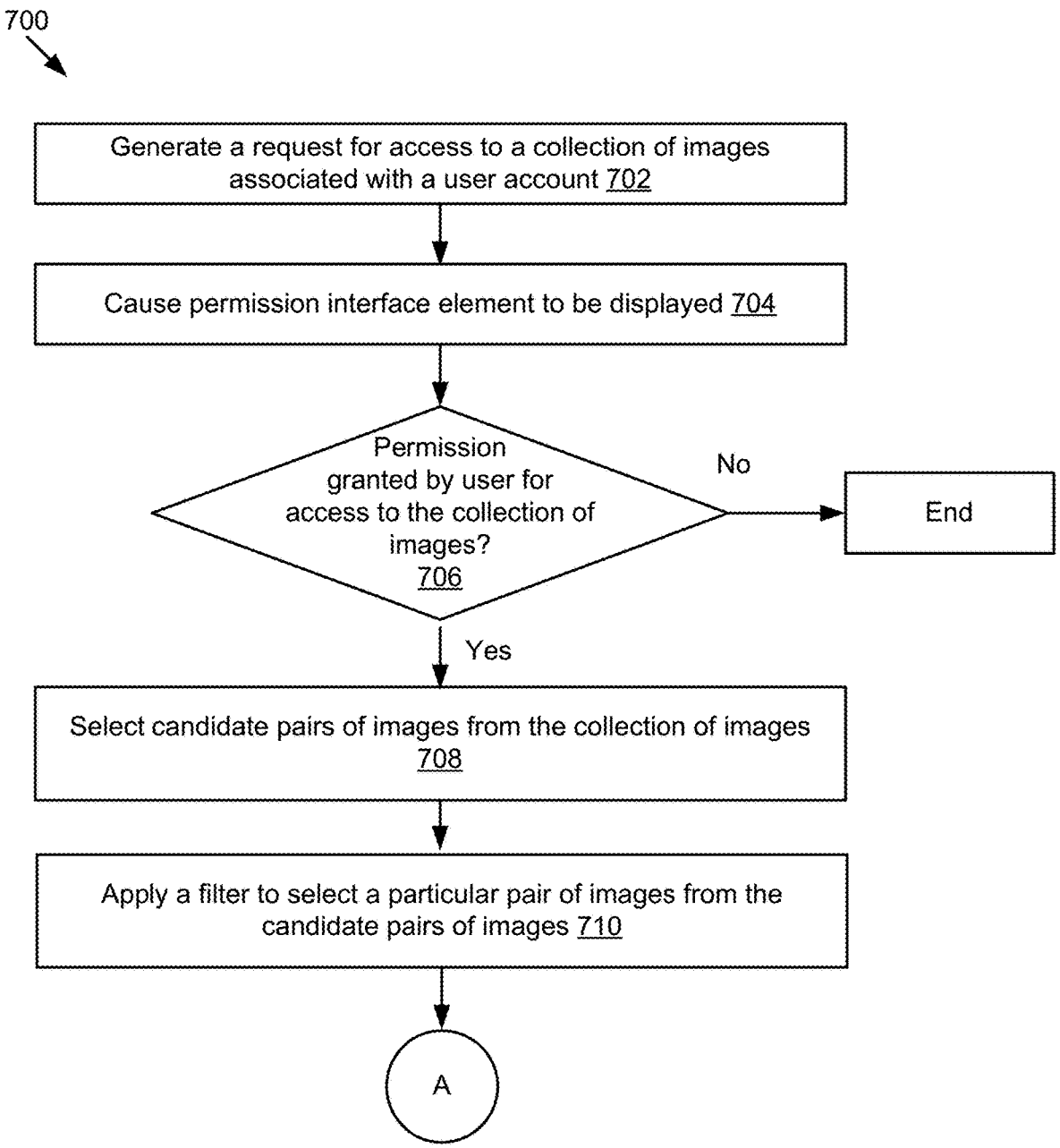
FIG. 7A-7B illustrate a flowchart for generating a video from a pair of images, according to some embodiments described herein.
Figure 7B:
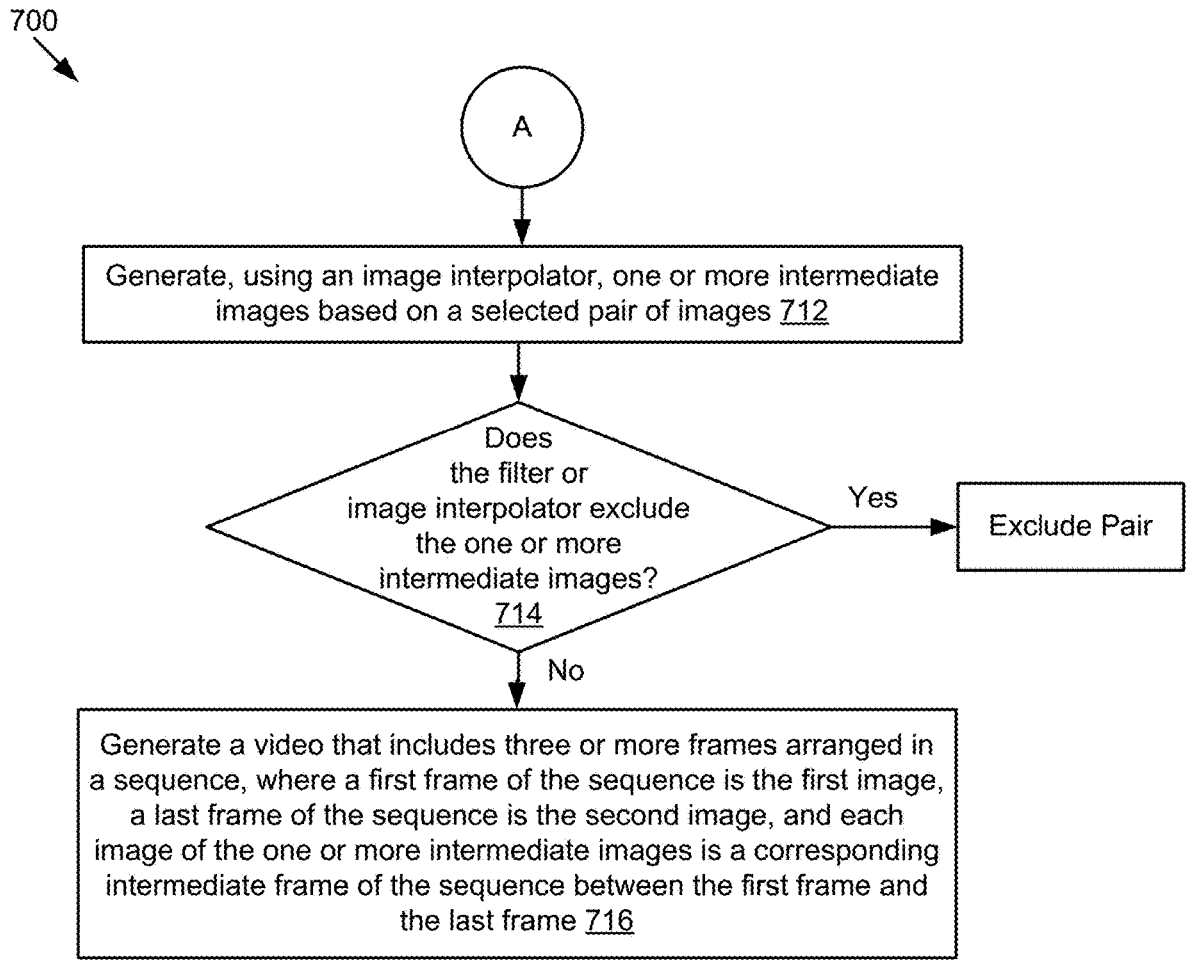

FIGS. 7A-7B are flow diagrams illustrating an example method 700 for generating a video from candidate pairs of images, according to some embodiments. The method illustrated in flowchart 700 may be performed by the computing device 200 in FIG. 2.

The method 700 may begin at block 702. In block 702, a request for access to a collection of media items associated with a user account is generated. In some embodiments, the request is generated by the user interface module 206. Block 702 may be followed by block 704.

At block 704, a permission interface element is caused to be displayed. For example, the user interface module 206 may display a user interface that includes a permission interface element requesting that the user wide permission to access the collection of media items. Block 704 may be followed by block 706.

At block 706, it is determined whether permission was granted by the user for access the collection of media items. In some embodiments, block 806 is performed by the user interface module 206. If the user does not provide permission, the method ends. If the user does provide permission, block 706 may be followed by block 708.

At block 708, candidate pairs of images are selected from the collection of images. For example, candidate pairs are selected as occurring during a bounded time period, such as the last week, month, etc. Alternatively, the candidate pairs may be received as they are created after the user captures images from the camera 243. Block 708 may be followed by block 710.

At block 710, it is determined whether the filter excludes the candidate pair of images. The filter may include a time filter, a motion filer, etc. If the determination is yes, the candidate pair of images are excluded. If the determination is no, any remaining candidate pairs of images may be considered particular pairs of images. Block 710 may be followed by block 712.

At block 712, an image interpolator generates one or more intermediate images based on a particular pair of images. Block 712 may be followed by block 714.

At block 714, it is determined whether the filter or image interpolator exclude the one or more intermediate images. If the determination is yes, the one or more intermediate images are excluded. If the determination is no, the one or more intermediate images are provided to the video generator. Block 714 may be followed by block 716.

At block 716, a video is generated that includes three or more frames arranged in a sequence, where a first frame of the sequence is the first image, a last frame of the sequence is the second image, and each image of the one or more intermediate images is a corresponding intermediate frame of the second between the first frame and the last frame.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is Obtained (such as to a city. ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs. CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
   selecting, from a collection of images associated with a user account, candidate pairs of images, wherein each candidate pair includes a first static image of a scene and a second static image of the scene from the user account;
   applying a filter to select a particular pair of images from the candidate pairs of images based on the particular pair of images failing to meet a threshold similarity;
   generating, using an image interpolator, one or more intermediate images based on the particular pair of images;
   providing the first static image as input to a depth machine-learning model, the depth machine-learning model outputting a three-dimensional representation of the scene; and
   generating a video that includes three or more frames arranged in a sequence, wherein a first frame of the sequence is the first static image, a last frame of the sequence is the second static image, and each of the one or more intermediate images is a corresponding intermediate frame of the sequence between the first frame and the last frame, wherein the video includes the three-dimensional representation of the scene.

2. The method of claim 1, wherein the filter further selects the particular pair of images based on the particular pair of images including a subject that a user associated with the user account expressed a preference for including in the video.

3. The method of claim 1, wherein the video includes at least one camera effect selected from a group of zooming, panning, and combinations thereof.

4. The method of claim 1, wherein the depth machine-learning model includes a convolutional neural network that outputs a low-resolution version of the three-dimensional representation and iteratively outputs improvements to the low-resolution version of the three-dimensional representation.

5. The method of claim 1, wherein the depth machine-learning model is trained using training data that includes depth maps.

6. The method of claim 1, wherein the first static image is in an x-y plane and the three-dimensional representation includes z-axis coordinates of objects in the three-dimensional representation.

7. The method of claim 1, wherein the image interpolator includes an interpolation machine-learning model that receives the first static image and the second static image as input and that outputs the one or more intermediate images.

8. A system comprising:
one or more processors; and
a memory coupled to the one or more processors, with instructions stored thereon that, when executed by the one or more processors, cause the one or more processors to perform operations comprising:
selecting, from a collection of images associated with a user account, candidate pairs of images, wherein each candidate pair includes a first static image of a scene and a second static image of the scene from the user account;
applying a filter to select a particular pair of images from the candidate pairs of images based on the particular pair of images failing to meet a threshold similarity;
generating, using an image interpolator, one or more intermediate images based on the particular pair of images;
providing the first static image as input to a depth machine-learning model, the depth machine-learning model outputting a three-dimensional representation of the scene; and
generating a video that includes three or more frames arranged in a sequence, wherein a first frame of the sequence is the first static image, a last frame of the sequence is the second static image, and each of the one or more intermediate images is a corresponding intermediate frame of the sequence between the first frame and the last frame, wherein the video includes the three-dimensional representation of the scene.

9. The system of claim 8, wherein the filter selects the particular pair of images based on the particular pair of images exceeding a motion threshold.

10. The system of claim 8, wherein the video includes at least one camera effect selected from a group of zooming, panning, and combinations thereof.

11. The system of claim 8, wherein the depth machine-learning model includes a convolutional neural network that outputs a low-resolution version of the three-dimensional representation and iteratively outputs improvements to the low-resolution version of the three-dimensional representation.

12. The system of claim 8, wherein the depth machine-learning model is trained using training data that includes depth maps.

13. The system of claim 8, wherein the first static image is in an x-y plane and the three-dimensional representation includes z-axis coordinates of objects in the three-dimensional representation.

14. The system of claim 8, wherein the image interpolator includes an interpolation machine-learning model that receives the first static image and the second static image as input and that outputs the one or more intermediate images.

15. A non-transitory computer-readable medium with instructions stored thereon that, when executed by one or more computers, cause the one or more computers to perform operations, the operations comprising:
selecting, from a collection of images associated with a user account, candidate pairs of images, wherein each candidate pair includes a first static image of a scene and a second static image of the scene from the user account;
applying a filter to select a particular pair of images from the candidate pairs of images based on the particular pair of images failing to meet a threshold similarity;
generating, using an image interpolator, one or more intermediate images based on the particular pair of images;
providing the first static image as input to a depth machine-learning model, the depth machine-learning model outputting a three-dimensional representation of the scene; and
generating a video that includes three or more frames arranged in a sequence, wherein a first frame of the sequence is the first static image, a last frame of the sequence is the second static image, and each of the one or more intermediate images is a corresponding intermediate frame of the sequence between the first frame and the last frame, wherein the video includes the three-dimensional representation of the scene.

16. The computer-readable medium of claim 15, wherein the filter selects the particular pair of images based on the particular pair of images falling below a motion threshold.

17. The computer-readable medium of claim 15, wherein the video includes at least one camera effect selected from a group of zooming, panning, and combinations thereof.

18. The computer-readable medium of claim 15, wherein the depth machine-learning model includes a convolutional neural network that outputs a low-resolution version of the three-dimensional representation and iteratively outputs improvements to the low-resolution version of the three-dimensional representation.

19. The computer-readable medium of claim 15, wherein the depth machine-learning model is trained using training data that includes depth maps.

20. The computer-readable medium of claim 15, wherein the first static image is in an x-y plane and the three-dimensional representation includes z-axis coordinates of objects in the three-dimensional representation.

* * * * *